April 22, 1969     T. E. GILDER     3,439,541
MULTI-RANGE PRESSURE MEASURING DEVICE
Filed June 9, 1967     Sheet _1_ of 2
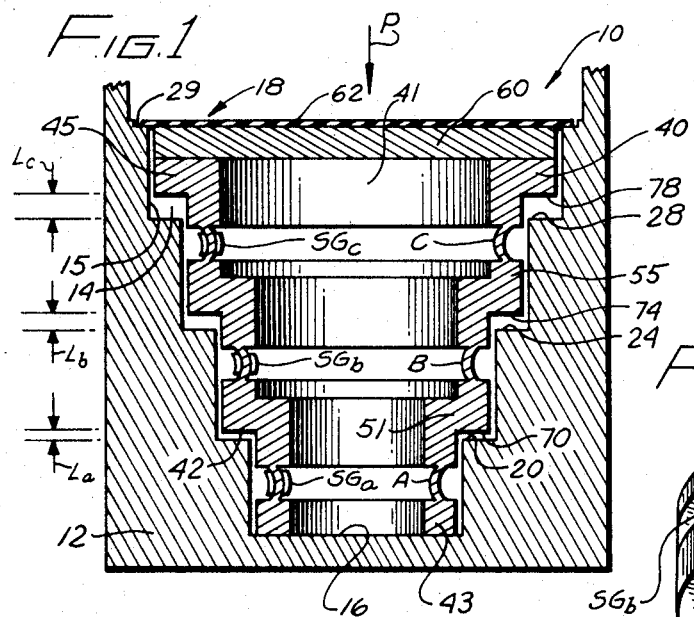
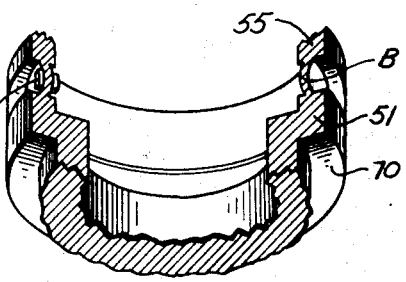
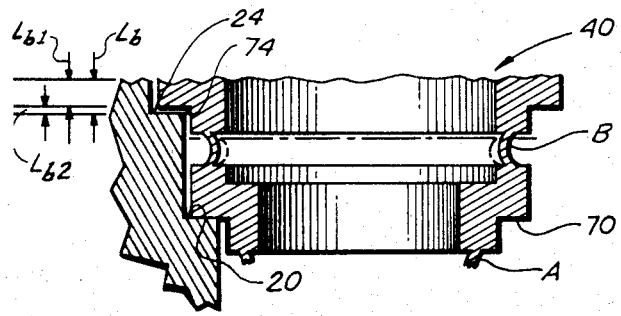
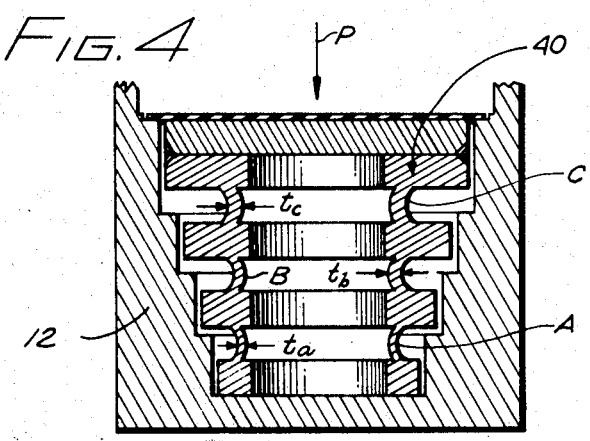
INVENTOR.
THOMAS E. GILDER
BY John E. Kelly
AGENT April 22, 1969     T. E. GILDER     3,439,541

MULTI-RANGE PRESSURE MEASURING DEVICE

Filed June 9, 1967

INVENTOR.
THOMAS E. GILDER
BY John E. Kelly
AGENT

United States Patent Office 3,439,541
Patented Apr. 22, 1969

3,439,541
MULTI-RANGE PRESSURE MEASURING DEVICE
Thomas E. Gilder, Chatsworth, Calif., assignor to
North American Rockwell Corporation
Filed June 9, 1967, Ser. No. 645,029
Int. Cl. G01l 9/00
U.S. Cl. 73—398
12 Claims

ABSTRACT OF THE DISCLOSURE

A pressure transducer having a housing in which is positioned a tubular shaped strain sensing unit with a plurality of concentrically aligned deflectable hoops. A force applied axially to the unit is measured by the amount of strain sensed by the hoops. The hoops deflect at different rates allowing pressure measurement over a selectively broad range.

Background of the invention

Transducers incorporating strain sensitive elements for measuring a variable force are well known in the prior art. However, transducers presently being used are greatly limited in their capacities for measuring force over a relatively broad range. To minimize rupturing risks, these transducers often cannot be operated over their maximum potential measuring ranges. When the anticipated force exceeds the capacity of an individual transducer, multiple transducers must be utilized. In this case excessive expenditures of time and money are required to incorporate the multiple transducers in a single system. In addition, the resulting system is often characterized by a severe weight penalty and poor space economizing.

Systems of conventional multiple transducers are also characterized by inherent inability to measure the applied force with high accuracy. This is because initial deflection in each transducer occurs in the non-linear range. The force measurement error is compounded, as the applied force is increased, because each successive transducer must also initially deflect in its non-linear range. The instant invention avoids these disadvantages by providing a single transducer incorporating a plurality of individual strain sensitive elements whose cumulative operations permit accurate force measurement over any selectable wide range.

Summary of the invention

Briefly described, the pressure transducer of this invention includes a hollow housing in which is positioned a tubular shaped sensing unit formed with a plurality of concentrically aligned deflectable hoops having different stiffnesses and deflection rates. The force to be measured is applied axially to one end of the sensing unit causing it to gradually collapse as the individual hoops are deflecting at their different rates. The hoops are separated from one another by annular shoulders that engage associated stop elements formed on the interior wall of the housing. When as associated shoulder and stop element become engaged, further deflection is prevented in an associated hoop. At this point the hoop will have attained a predetermined maximum deflection. In a similar manner, as the applied force is increased, the stiffer hoops, with relatively lower deflection rates, attain their maximum deflection. The number of hoops needed is a function of the hoop stiffnesses and the maximum pressure range over which the force is to be measured. Strain sensitive elements are positioned on the hoops to measure the induced strain that is a function of the force applied. Accurate force measurements are accomplished since the hoops are designed to sequentially deflect in the linear range (i.e. the range where the stress-strain curve is substantially a straight line) of the material from which the hoops are constructed. The relative stiffness and deflection rates of the respective hoops may be made different, according to one embodiment of this invention by varying their diameters and in accordance with a second embodiment by keeping their diameters substantially equivalent while varying their wall thicknesses.

The foregoing and other advantages of this invention will become fully understood upon studying the following detailed description in conjunction with the detailed drawings in which:

FIG. 1 is a sectional view taken along the longitudinal axis of the pressure transducer showing its housing portion and sensing unit portion, the sensing unit being in its relaxed "no load" position.

FIG. 2 is a perspective view of a section of the sensing unit showing the curvature of one deflectable hoop.

FIG. 3 is a fragmented view of portions of the housing and sensing unit sections showing their co-action at a particular stage when the force is being applied.

FIG. 4 is a sectional view taken along the longitudinal axis of an alternative embodiment of a pressure transducer.

Description of the preferred embodiments

Figure 5:
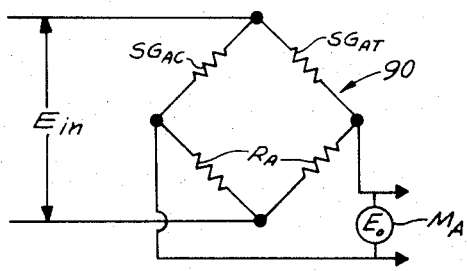
FIG. 5 is a schematic view of a Wheatstone bridge circuit incorporating strain gages associated with one hoop of the sensing unit portion.

Referring now to a specific embodiment of this invention, FIG. 1 shows a longitudinal section of a pressure transducer 10. Transducer 10 includes a solid cylindrical support element or housing 12 which is partially hollowed to constitute a symmetrical cavity 14. Cavity 14 defines the interior wall 15 of housing 12 and an opening 18 at one end of housing 12. A base wall portion 16 of interior wall 15 is disposed at the opposite end of housing 12. Extending transversely relative to the axis of housing 12 are a plurality of annular ledges 20, 24, 28, and 29. The ledges are separated by annular wall sections aligned parallel relative to the axis of housing 12. Thus the geometry of interior wall 15 is characterized by a plurality of annular steps increasing in diameter from base 16 toward opening 18.

Occupying a portion of cavity 14 is a tubular shaped sensing unit 40. Sensing unit 40 has a centrally hollowed portion 41 and a symmetrical exterior wall 42 whose geometry is approximately complementary with interior wall 15 of housing 12. Sensing unit 40 is integrally formed with a series of annular relatively stiff sections 43, 51, 55, and 45. These sections are concentrically aligned and increase in diameter in a direction from section 43 to 45. Sensing unit 40 is supported by housing 12. Section 43 is rigidly attached by welding or any suitable mechanical fastening means to base 16. Section 45 is rigidly attached to a pressure responsive metallic bearing plate 60. A flexible sealing membrane 62 attached to bearing plate 60 is of a diameter sufficient to overlap ledge 29 to which it is rigidly secured. Bearing plate 60 and its associated flexible sealing membrane 62 are designed to transmit uniformly distributed or concentrated forces represented by arrow P. The force P which is to be precisely measured in accordance with this invention is transmitted to sensing unit 40 which is gradually compressed in a telescoping movement.

Sensing unit 40 is integrally formed with a plurality of deflectable hoops A, B, and C that are constructed from suitable metallic spring material such as 17–4 PH stainless steel Ni-Span-C alloy, or the like. The hoops are aligned concentrically with their diameters increasing from hoop A to C. While the hoops are shown as continuous, they could be designed with slight interruptions without impairing the structural integrity of unit 40. The hoops are bowed radially inwardly toward the axis of unit 40 so that their interior walls are convex and their exterior walls are concave. If the hoops were bowed radially outwardly the adjacent interior wall 15 would have to be designed to provide extra bending space. FIG. 2 illustrates the curvature of hoop B. Stiffening sections 51, 55, and 45 are formed with flat shoulders 70, 74, and 78, respectively, that lie in planes disposed transversely relative to the axis of sensing unit 40. As will be more fully explained below. shoulders 70, 74, and 78 are designed to mate with and become seated on ledges 20, 24, and 28, respectively as sensing unit 40 is gradually compressed to its fully collapsed condition.

Pairs of strain gages $SG_a$, $SG_b$, and $SG_c$ are secured to the opposite walls of hoops A, B, and C, respectively. The strain gages are positioned over the central regions of their respective hoops to assure that they will experience maximum strain during hoop deflection. The strain gages may be of any conventinoal type such as patches incorporating small electrical wires bonded to a substrate of Mylar. In the alternative, the strain gages may be made of semiconductive material. As shall be more fully described, in conjunction with FIGS. 5, 6, 7, and 8 strain gages $SG_a$, $SG_b$, and $SG_c$ are electrically hooked up in conventional Wheatstone bridges.

Prior art pressure transducers intended to perform with high accuracy often suffer the disadvantages of being heavy, bulky, and costly. To guard against overloading and potential permanent distortion or destruction, these transducers are designed with safety factors which contribute to their bulkiness. Frequently when pressure must be measured over a broad range, a number of pressure transducers is required. The requirement of multiple transducers requires extra space and problems are created regarding the correlation of the multiple transducers. The pressure transducer of the instant invention obviates these problems and is characterized by high accuracy, convenient packaging, minimum space, relatively few moving parts and capacity to measure over a broad range by a unitary transducer. Sensing unit 40 may be constructed and sold separately from housing 12.

Before any force is exerted on transducer 10, hoops A, B, and C are in their relaxed condition as illustrated in FIG. 1. Under this "no load" condition shoulders 70, 74, and 78 are spaced from their respective ledges 20, 24, and 28 by distances $L_a$, $L_b$, and $L_c$. These are the distances that the shoulders must travel before their motions are stopped by the respective ledges. For design convenience $L_b$ and $L_c$ may be two and three times the length of $L_a$. Hoop A is designed so that it will experience a predetermined maximum deflection $F_a$ (max.) at the time shoulder 70 has completely travelled through distance $L_a$ and has become bottomed out on ledge 20. Hoops B and C are stiffer than hoop A so that a greater force P is acquired to bend them to their maximum deflections $F_b$ (max.) and $F_c$ (max.), respectively. The maximum deflection in each hoop is measured in a radially inward direction and is equivalent to the distance that the midpoint of each hoop travels between its initial or relaxed position and its maximum deflection position. As force P is initially applied to transducer 10, hoop A begins to deflect inwardly at a greater bending rate than hoops B and C. This condition is assured by making hoops B and C stiffer than hoop A and more resistant to bending. With regard to the embodiment shown in FIG. 1, this result is achieved because the mass in hoops B and C is greater than that in A. An alternative way to make the hoop stiffness different is illustrated in the embodiment of FIG. 4, to be more fully described below.

FIG. 3 represents the condition of a portion of sensing unit 40 at the point in time when shoulder 70 mates with ledge 20. Hoop A will then have attained its maximum deflection $F_a$ (max.). Tension on the interior wall and compression on the exterior wall of hoop A will be at their maximum values. Further straining by strain gage $SG_a$ is prevented. At the time when shoulder 70 first bottoms out on ledge 20, shoulder 74 will have travelled through a distance $L_{b1}$. Distance $L_{b1}$ is equivalent to distance $L_a$ plus an increment of distance due to partial deflection in hoop B. As previously mentioned, hoop B being relatively stiffer than hoop A will not have deflected as much as hoop A. The remaining distance between shoulder 74 to its seating position on ledge 24 is represented by distance $L_{b2}$. As force P is increased, shoulder 74 will travel through remaining distance $L_{b2}$ until it becomes bottomed out on ledge 24. At this point maximum deflection $F_b$ (max.) will be attained in hoop B (this condition being illustrated by the phantom line representing the interior wall of hoop B).

An important advantage of the instant invention resides in the fact that as shoulder 74 is moving through distance $L_{b2}$ the deflection of hoop B is occurring entirely within its linear range. That is, the stress-strain curve is obeying a straight line. As a result, the strain sensed in strain gage $SG_b$ is a highly accurate function of the value of load P. Thus the partial deflection in hoop B as shoulder 70 moves on to ledge 20 passes beyond the non-linear range into the linear range where signals may be generated to accurately measure load P.

It is contemplated that the signals generated by the strain gage $SG_b$ will not be used to measure force P until after the maximum deflection $S_a$ (max.) is reached in hoop A. The relationship between hoop B and hoop C is the same as that between hoop A and hoop B. Thus when maximum deflection $F_b$ (max.) is reached in hoop B, hoop C will have been partially deflected into its linear range. Further deflection in hoop C will generate signals that accurately measure force P. In essence the linear ranges of successive hoops will be brought into operation sequentially rather than simultaneously. Additional hoops of greater diameter than hoop C could be added depending upon the contemplated range of the force to be measured. It should be noted that the only inaccurate measurements of load P will be confined to the relatively short time period when load P is causing hoop A to deflect through its non-linear range. Hoop A can be characterized by a stiffness so that the time period or range of inaccurate force measurement is relatively immaterial.

In accordance with this invention, an alternative embodiment of a pressure transducer 10 is shown in FIG. 4. Sensing unit 40 has three concentrically aligned hoops, A, B, and C. Unlike the embodiment shown in FIG. 1, hoops A, B, and C, have equal inner diameters and different web thickness $t_a$, $t_b$, and $t_c$, respectively. Due to the different web thicknesses, the stiffness of hoop B is greater than that of hoop A and less than that of hoop C. Thus the deflection rate of hoop A, in response to applied load P, is greater than that of hoop B. The web thicknesses are designed so that, as in the case of the FIG. 1 embodiment, when maximum deflection $F_a$ (max.) is attained in hoop A, further deflection in hoop B will proceed in its linear range. As previously indicated, this permits highly reliable measurements of load P. Relative stiffness between the hoops could be further varied by changing their relative axial lengths.

Figure 5A:
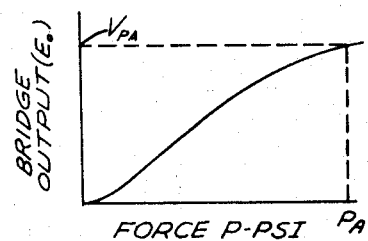
FIG. 5a is a graph corresponding to FIG. 5 showing voltage output from the circuit plotted against the force being measured.

Shown in FIG. 5 is a conventional Wheatstone bridge 90 for measuring force P during the deflection of hoop A. Conventional dummy resistors $R_a$ are electrically connected in a pair of arms of bridge 90. In the other pair of arms, strain gages $SG_a$ are connected. Strain gage $SG_{ac}$ refers to the one attached to the interior wall of hoop A and strain gage $SG_{at}$ refers to the one attached to the exterior wall of hoop A. During hoop deformation the tension in strain gage $SG_{at}$ is substantially identical with the compression experienced in strain gage $SG_{ac}$. For purposes of illustration, the strain gages may be constructed of semi-conductor material such as silicon, germanium, carbon, etc. As is well-known in the case of N-type semiconductor material, its piezo resistive character is such that compressive strain will increase and tensile strain will decrease its electrical resistance. Thus during deformation of hoop A the increased electrical resistance in strain gage $SG_{ac}$ and decreased electrical resistance in strain gage $SG_{at}$ will generate an output voltage $E_o$. Output voltage $E_o$ is connected to a suitable output signal meter M. Meter M is calibrated to precisely indicate the force P. During flexure of hoop A, output voltage $E_o$ is constantly increasing and thereby indicating the intensity of load P by way of meter M. FIG. 5a shows a graph of output voltage $E_o$ plotted against load P. When the maximum deflection is attained in hoop A, the load P will be $P_a$ and the output voltage $E_o$ at that time is represented by $V_{pa}$. Circuit 90 is a half active bridge. Alternatively the dummy resistor $R_a$ could be replaced by other strain gages to achieve a full active bridge. The bridge would then be more sensitive.

Figure 6:
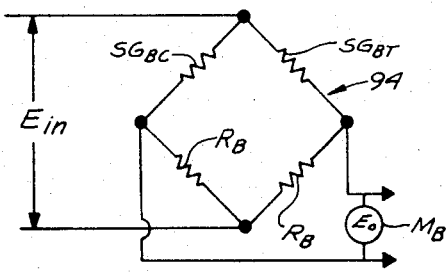
FIG. 6 is a schematic view of a Wheatstone bridge circuit incorporating strain gages associated with another hoop of the sensing unit.

Wheatstone bridge 94 shown in FIG. 6 is similar to Wheatstone bridge 90. Strain gages $SG_{bt}$ and $SG_{bc}$ are attached to the exterior and interior walls respectively of of hoop B. An important aspect of this invention is set forth in the graph shown in FIG. 6a. The electrical output $E_o$ of bridge 94 is plotted against the force P as experienced in hoop B. The graph of FIG. 5a is superimposed in part to show that when the maximum deflection $F_a$ (max.) is attained in hoop A partial deflection in hoop B will have exceeded the non-linear range 95 of the material used in constructing the sensing unit. Further deflection in hoop B will be in linear range 96.

Figure 6A:
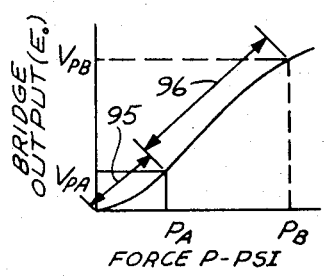
FIG. 6a is a graph corresponding to FIG. 6 showing voltage output from the circuit plotted against the force being measured.
Figure 7:
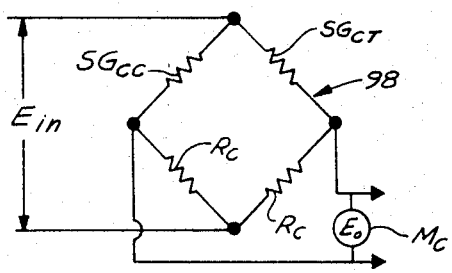
FIG. 7 is a schematic view of a Wheatstone bridge circuit incorporating strain gages associated with yet another hoop of the strain sensing unit.
Figure 7A:
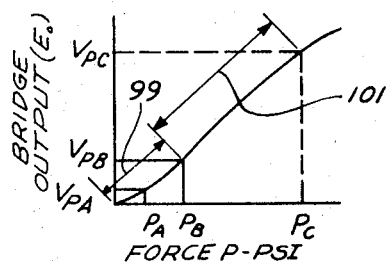
FIG. 7a shows a graph corresponding to FIG. 7 showing voltage output from the circuit plotted against the force being applied.

FIG. 7 shows a Wheatstone bridge circuit 98 used in conjunction with hoops B. Strain gages $SG_{ct}$ and $SG_{cc}$ are fixed to the exterior and interior walls of hoop C respectively. FIG. 8a is a graph of force P plotted against output voltage $E_o$ generated by circuit 98. Portions of the graphs of both FIGS. 5a and 6a are superimposed over this plot. As indicated, when the maximum deflection $F_b$ (max.) in hoop B is attained, the partial deflection in hoop C will have passed through its non-linear range 99. Continued deflection in hoop C will occur in its linear range 101. Highly accurate measurements of load P can be made as measured by output voltage $E_o$ in this linear range. Potential rupturing or permanent deformation of the individual hoops is prevented because they are designed so that they will attain their maximum deflection prior to reaching the yield point stress of the material from which they are constructed.

It is contemplated that in accordance with the force measuring arrangement described above that after maximum deflection $F_a$ (max.) in hoop A is reached then further measurement will be made by meter $M_b$. In a similar manner, after maximum deflection $F_b$ (max.) in hoop B is attained, the measurement of force P will be continued by using meter $M_c$. Additional force reading meters would be used if additional hoops were employed. Such would be desirable if the force were to be extended over a broader range. A single hoop would not be able to accurately measure force over the range that can be covered by the multiple hoops. For example, an extra stiff hoop, in proportion to its overall range capacity, would experience considerable deflection in its non-linear range and therefore the results would be inaccurate and unreliable. Conversely, if the hoop were made less stiff its overall range would be greatly limited, i.e., it would become ruptured and permanently deformed after relatively slight deflection as compared to a stiffer hoop. The instant invention avoids both the foregoing disadvantages since its multiple hoops are highly accurate over any desired pressure measurement range and they cannot become ruptured because deflection of each individual hoop is stopped then it reaches a predetermined stress.

Figure 8:
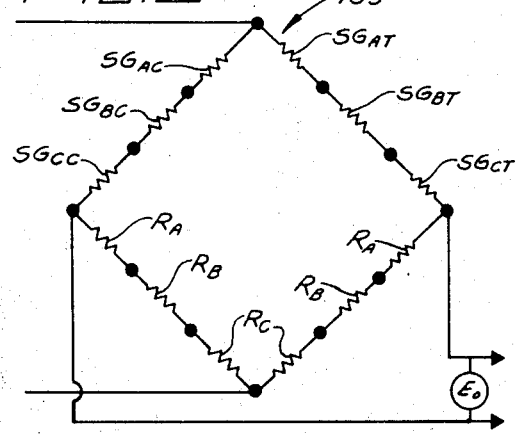
FIG. 8 is a schematic view of a Wheatstone bridge circuit incorporating all the strain gages depicted in FIGS. 5, 6, and 7.

FIG. 8 shows a single Wheatstone bridge 105 used for measuring load P over its entire force range. This has the advantage of avoiding the use of multiple circuits as shown in FIGS. 5, 6 and 7, however, the measurement of load P would be slightly less accurate. The electrical resistance changes in the strain gages would be summed to generate a single output voltage $E_o$. The electrical signal from strain gages $SG_{at}$ and $SG_{ac}$ would become constant after maximum deflection $F_a$ (max.) was attained in hoop A. The slight inaccuracies would be caused by the partial deflections of the multiple hoops prior to their exceeding their respective non-linear ranges.

The described specific embodiments of this invention were chosen to best illustrate this invention.

I claim:

1. A transducer for measuring force applied thereto comprising;
   a sensing unit,
   pressure responsive means connected to one end of the sensing unit for transmitting axial force to the sensing unit,
   at least two deflectable hoops formed with the sensing unit in such a fashion as to be axially deflected by said force, a first hoop having greater stiffness than a second hoop so that when force is applied the first hoop will deflect at a greater rate than the second hoop, and
   strain sensitive elements positioned on each hoop to sense strain as they are being deflected.

2. The structure according to claim 1 further comprising stop means adjacent the sensing unit for stopping deflection of the first hoop when the hoop attains a predetermined strain.

3. The structure according to claim 2 wherein the relative stiffnesses of the hoops are such that at the time when deflection is stopped in the first hoop, deflection of the second hoop will have passed through its non-linear range into its linear range.

4. A transducer for measuring force applied thereto comprising;
   support means,
   a tubular shaped sensing unit connected at one end to the support means,
   pressure responsive means connected to the other end of the sensing unit for transmitting axial force to the sensing unit,
   at least two concentrically aligned deflectable hoops formed with the sensing unit in such a fashion as to be axially deflected by said force, a first hoop having smaller stiffness than a second hoop so that when force is applied the first hoop will deflect at a greater rate than the second hoop,
   strain sensitive elements positioned on each hoop to sense strain as they are being deflected,
   stop means formed on the support means,
   a shoulder formed on the sensing unit between the first and second hoops, the shoulder being spaced from the stop means when no force is being exerted,
   whereby when force is applied, the stop means will stop deflection of the first hoop when it attains a predetermined strain.

5. The structure according to claim 4 wherein the central portion of the hoops are bowed relative to the axis of the sensing unit so as to control the direction in which they deflect.

6. The structure according to claim 5 wherein the hoops are bowed radially inwardly.

7. The structure according to claim 4 wherein the first hoop has a smaller diameter than the second hoop.

8. The structure according to claim 4 wherein the first hoop has a wall thickness less than that of the second hoop, the inner diameters of the hoops being substantially equivalent.

9. The structure according to claim 4 wherein the strain sensitive elements are strain gages, pairs of which are positioned on the central portions of the interior and exterior walls of the hoops and each pair of strain gages is positioned in a Wheatstone bridge circuit which generates a signal for measuring the force being exerted.

10. The structure according to claim 4 wherein the relative stiffnesses of the hoops are such that at the time when deflection is stopped in the first hoop, deflection of the second hoop will have passed through its non-linear range into its linear range.

11. The structure according to claim 4 further comprising;
    a third deflectable hoop formed with the sensing unit, the third hoop being concentrically aligned with and having greater stiffness than the second hoop;
    second stop means formed on the support means,
    a second shoulder formed on the sensing unit between the second and third hoops, the second shoulder being spaced from the second stop means when no force is being exerted,
    whereby when force is applied, the second stop means will stop deflection of the second hoop when it obtains a predetermined strain.

12. The structure according to claim 11 wherein the relative stiffnesses of the second and third hoops are such that at the time when deflection is stopped in the second hoop, deflection of the third hoop will have passed through its non-linear range into its linear range.

References Cited
UNITED STATES PATENTS

| | | | |
|---|---|---|---|
| 2,421,222 | 5/1947 | Schaevitz. | |
| 2,582,886 | 1/1952 | Ruge | 73—141 |
| 3,293,916 | 12/1966 | Goff | 73—398 |

LOUIS R. PRINCE, *Primary Examiner.*

D. O. WOODIEL, *Assistant Examiner.*

U.S. Cl. X.R.

73—141; 338—4